United States Patent [19]
Hodgdon, Jr.

[11] 3,887,499
[45] June 3, 1975

[54] CATION EXCHANGE MEMBRANES HAVING CARBOXYLIC AND SULFONIC ACID FUNCTIONALITY

[75] Inventor: Russell B. Hodgdon, Jr., Sudbury, Mass.

[73] Assignee: Ionics, Incorporated, Watertown, Mass.

[22] Filed: Aug. 23, 1973

[21] Appl. No.: 394,212

Related U.S. Application Data

[63] Continuation of Ser. No. 205,056, Dec. 6, 1971, abandoned.

[52] U.S. Cl. .............................. 260/2.2 R; 204/296
[51] Int. Cl. .............................................. C08f 19/20
[58] Field of Search .................................. 260/2.2 R

[56] References Cited
UNITED STATES PATENTS

| | | | |
|---|---|---|---|
| 2,678,306 | 5/1954 | Ferris | 260/2.2 |
| 2,731,408 | 1/1956 | Clarke | 204/151 |
| 2,731,411 | 1/1956 | Clarke | 204/180 |
| 2,844,546 | 7/1958 | Abrams | 260/2.2 |
| 2,962,454 | 11/1960 | McRae et al. | 260/2.2 |
| 3,284,419 | 11/1966 | Helfferich | 260/79.3 |

FOREIGN PATENTS OR APPLICATIONS

| | | |
|---|---|---|
| 184,427 | 7/1966 | U.S.S.R. |
| 185,052 | 7/1966 | U.S.S.R. |

OTHER PUBLICATIONS

Kolesnikov et al., Sin. Svoistva Ionoobmen. Mater. 1968, 61–65.

Sigodina et al., Vysokomolekul. Soedin., Khim. Svoistva i Modifikatsiya Polimerov, Sb. Statei, 1964, 76–79.

*Primary Examiner*—Melvin Goldstein
*Attorney, Agent, or Firm*—Norman E. Saliba

[57] ABSTRACT

A cation exchange membrane containing functional groups of both the sulfonic acid and carboxylic acid radicals which allows the membranes to maintain its conductivity throughout the entire pH range. This unique property gives this high capacity pH insensitive membrane particular value in electrolytic cells as hydraulic diaphragms to separate a basic solution from an acid solution as is encountered in caustic-chlorine cells or other type cells which electrolytically decompose neutral salt solutions such as sodium sulfate into their basic and acidic components of caustic soda and sodium acid sulfate. The capacity of this membrane is much higher than the presently known sulfonic acid salt types.

1 Claim, 1 Drawing Figure

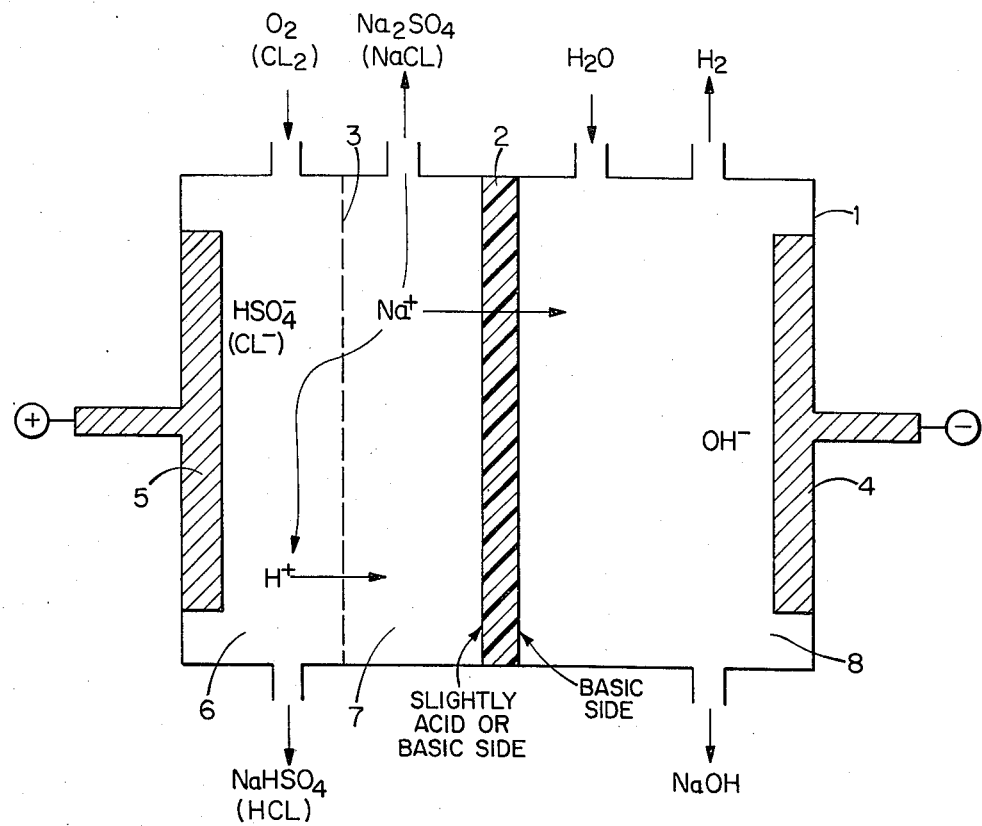

CATION EXCHANGE MEMBRANES HAVING CARBOXYLIC AND SULFONIC ACID FUNCTIONALITY

This is a continuation of application Ser. No. 205,056, filed Dec. 6, 1971, and now abandoned.

This invention relates to high capacity, bifunctional ion-exchange structures having at least two dimensions in excess of one cm. and possessing high ionic conductivity over the entire pH range and their use as hydraulic separators in electrolytic cells. The invention relates particularly to cation permselective membranes comprised of a substantially insoluble organic polymer matrix bonded to cation exchange functional groups of both the sulfonic acid and the carboxylic acid radicals. More specifically it relates to the composition of and method for preparing such membranes and their use as fluid separators of the catholyte and anolyte in electrolytic cells especially of the cell types and processes disclosed in U.S. Pat. Nos. 3,135,673, 3,222,267, 3,475,122, 3,515,513, 3,523,755, 3,523,880 and 3,524,801 (which disclosures are to be incorporated herein by references) wherein a neutral salt solution such as an alkaline metal sulfate or chloride salt is split by an applied decomposition voltage into an acid and/or acid salt, a caustic solution and electrode gases.

The prior membrane art as represented for example by the U.S. patents to Clarke No. 2,731,411 and No. 2,731,408 show electrolytically conductive, solid, unfractured large dimensional cation-exchange polymeric structures hereinafter termed membranes comprised of vinyl aromatic compounds containing either sulfonic acid (—$SO_3H$) or carboxylic acid (—COOH) groups respectively. These homogeneous membranes are selectively permeable to cations and are substantially water impermeable under ordinary pressure differentials so that they are useful as hydraulic separators or diaphragms in electrolytic cells such as those employed in the process for removing and recovering sulfur dioxide from a waste gas stream as is fully described in U.S. Pat. No. 3,475,122 and others as mentioned hereinabove. In this process the cell electrolytically converts at its respective electrodes a neutral salt solution such as sodium sulfate into its separate acidic components ($H_2SO_4$ and/or $NaHSO_4$) and its basic component (NaOH). The caustic is employed to scrub out $SO_2$ from a waste gas stream and the resulting spent caustic is combined with the produced acidic components to reform the sodium sulfate and release $SO_2$ gas. The resulting sodium sulfate is then recycled as feed solution back to the electrolytic cell and the $SO_2$ gas is recovered as a valuable product for conversion into sulfuric acid.

In the above described electrolytic "$SO_2$ scrubber" cell it was determined that the preferred cation selective membrane for use therein should have a minimum capacity of about 4 meq/dry gram of resin and a preferred cross-linking (XL) content of about 40–50%, that is, the membrane resin monomer composition should comprise in mole % of the total polymerisable material about 40–50% of a cross linking monomer such as divinyl benzene Under the general teachings of the Clarke U.S. Pat. No. 2,731,411 patent, homogeneous cation selective membranes may be produced by sulfonating a polymeric matrix structure resulting from combining a polyvinyl aromatic compound such as divinyl benzene with a monovinyl aromatic compound such as ethyl styrene diluted in a suitable non-polymerizable organic solvent and polymerized in the presence of a catalyst. The resulting membrane structure is characterized for example by recurring units as shown in the following formula I:

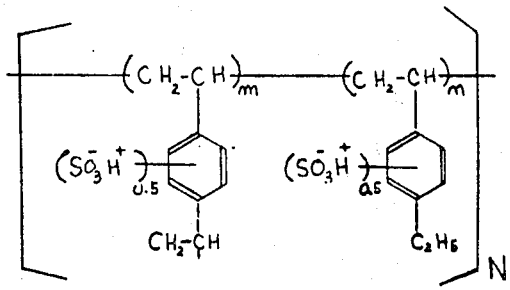

In the manufacture of sulfonated membranes employing commercial divinyl benzene and a monovinyl benzene compound such as ethyl styrene dissolved in a non-polymerizable solvent in accordance with the above mentioned patent, it was determined that the resulting membranes when in their sodium form had maximum capacities generally of about 3.0 meq/dry gram of resin. While such a sulfonic acid membrane has the advantage of being insensitive to pH changes (since it exhibits good conductivity over the entire pH range) its use in the electrolytic "scrubber" cell was not favored because of the relatively low capacity and the only fair conductivities attainable especially in the preferred cross-linking range.

On the other hand the carboxylic acid membranes as typified by U.S. Pat. No. 2,731,408 supra, and represented for example by recurring units as shown in the following formula II:

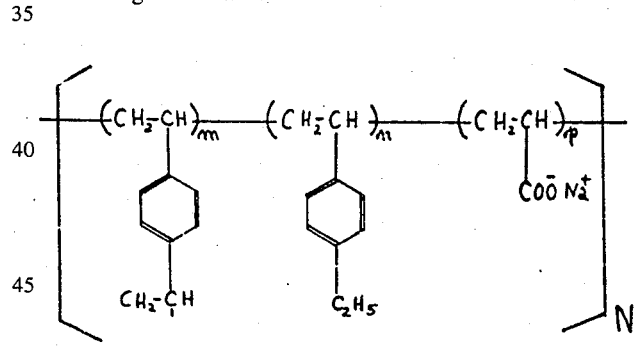

was proven to have (in its sodium form) increased capacity over the sulfonated membranes with the additional advantage that when employed as ion exchange separators in the above described electrolytic cell they have super-conductivity in the pH range of 6–14. However, they have poor conductivity should the pH in the system in which they are used drop down especially to 4 or less and they also are not dimensionally stable with changes in pH. These advantages are believed caused by the highly dissociated —$COO^-Na^+$ groups being changed almost completely to the poorly ionized —COOH groups when the membrane is in an acid invironment thus causing both the ionic conductance and exchange to be severely reduced along with a physical shrinking of the membrane structure.

A prior art method for solving the non-conductance problem just described was to make the carboxylic acid membrane sufficiently porous so that it would allow caustic solution to leak through from the catholyte side of the membrane to the slightly acid or near neutral opposite side thus keeping substantially all the —$COO^-$ groups on the membrane in the highly dissociated ionic form. This however defeats the very object sought, that is to prevent passage of hydroxyl ions in the cathode compartment in a direction from the cathode side of the membrane through to the membrane side facing the anode of the electrolytic cell, thus resulting in a net loss of caustic production.

Therefore the primary object of this invention is to prepare cation selective membranes comprised of a cross-linked polymeric matrix of an olefinic carboxylic acid forming compound, a polyvinyl benzene compound and a monovinyl benzene compound which matrix has been sulfonated to form a high capacity, ion-exchanger having usage over the entire range of pH values, viz. to be operationally functional from pH=0 to pH=14.

Another object is make a bifunctional-cation-selective membrane having a capacity of at least about 4 meq/per dry gram of resin.

Another object is to prepare a substantially insoluble, homogenous, cross-linked cation exchange membrane which has improved dimensional stability over the entire pH range.

Another object is to utilize the bifunctional cation selective membrane herein disclosed as a hydraulic separator in an electrolytic cell which produces hydroxide at the cathode and an acid or acid salt at the anode.

Still another object of this invention is to utilize the above novel cation selective membrane as a fluid separator or barrier between a pair of electrodes especially in a "caustic-chlorine" or in a "$SO_2$ scrubber" type electrolytic cell.

Other objects will appear obvious from the following description and appended drawing and claims.

Applicant has found that by combining the presence of the carboxylic acid groups with the sulfonic acid groups (or phosphonic acid groups) in a formulation for cationic selective membranes; capacities from about 4 to about 10 meq-per dry gram of resin may be obtained. In addition, and of great importance is that preferably at least about 40 to about 55% of the total functional groups in the combined formulation are pH independent groups (in terms of ionization; that is the strongly acidic groups such as $—SO_3^-M^+$ or $-PO_3^-(M^+)_2$. Thus it is preferred that the polymer moiety contain an average of at least about 0.65 to 1.2 sulfonic acid groups ($SO_3^-H^+$) for each carboxylic acid group (COOH); the $SO_3^-H^+$ groups becoming attached to the available aromatic nuclei of the vinyl constituents such as the divinyl benzene and the ethyl styrene monomers. These novel resins containing the different functional groups can be defined structurally by recurring units as shown in the following formula III:

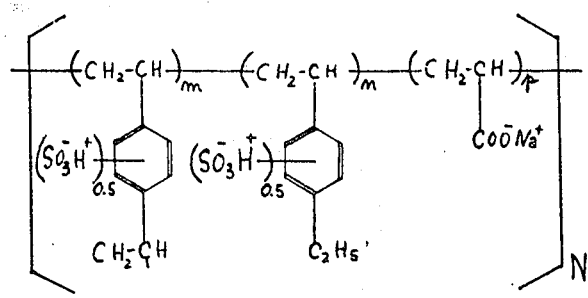

where $N$ = degree of polymerization, $M^+$= metal ion (usually $Na^+$), $m,n$ and $p$ = mols of constituent monomeric units in the polyelectrolyte; where for example m represents mols of divinyl benzene, n represents mole of ethyl styrene and p represents mols of acrylic acid.

In this resin (Formula III) the $—SO_3^-M^+$ groups (or in the alternate phosphonic acid groups) conduct most of the ionic currents below about a pH 4 with all functional groups conducting to some degree at a pH level about above 4. The membranes will function satisfactory where the strongly acid groups are present in the polymer to a lesser amount or to a greater amount than the weakly carboxylic acid groups. However, as noted in the above formula the ideal ratio of the sulfonic acid groups to the carboxylic groups is about one to one.

The polymer matrix which acts as the skeleton for the various functional acidic groups of the novel bifunctional membrane of the present invention may be varied as to their chemical structure over a considerable range as is well known in the art of making unifunctional membranes as described for example in the Clarke patents. The olefinic carboxylic acid-forming compound which constitutes one of the ingredients of the present product of the invention may be selected from one or more of the groups consisting of maleic anhydride, acrylic acid and its alpha derivatives and the anhydrides, esters, and acid chlorides of acrylic acid and its alpha derivatives. The preferred olefinic acid forming compounds employed in the practice of the present invention is acrylic acid or methacrylic acid since the resulting resins will possess a greater number of carboxylic groups per unit of weight and therefor high capacities. As will now be appreciated the carboxylic acid groups may be carried by such monomeric components as acrylic, methacrylic, itaconic, crotonic, maleic, fumaric, vinyl benzoic and the ortho, meta and para isomers, vinyl napthaic, perfluoro-acrylic and the perfluoro-methacrylic acid groups. Where the olefinic carboxylic monomer is selected from an anhydride, ester, or acid chloride the respective groupings are hydrolyzed after polymerization to form the carboxyl group in the polymeric matrix. The resulting polymer is thereafter then directly sulfonated or phosphonated as required.

The monovinyl aromatic monomeric component of the membrane can be employed individually or as mixtures and may be styrene(vinyl benzene) or its nuclear and/or alpha substituted derivatives such as ethyl vinyl benzene (ethyl styrene) vinyl toluene(methyl styrene) and its isomers, chlorostyrenes, paramethylstyrene, cyanostyrene, methoxylstyrene, acetylstyrene, dimethylstyrene and the like. Although the mole ratio of the carboxylic forming compound to the mono vinyl aromatic compound may be widly varied from 1:3 to 3:1 the preferred ratio on a molar basis is from 1:1 to 1:2.

The polyvinyl aromatic monomer which furnishes the crosslinking groups to produce an insoluble resin may comprise divinyl benzene, and substituted derivatives thereof such as the nuclear and/or alpha substituted derivatives such as divinyl toluene $\alpha\alpha$-dimethyl divinyl benzene, $\alpha\alpha$-dimethyl divinyl toluene and the like. Also useful are trivinylbenzene, trivinylnaphthalene etc.

The divinyl benzene (DVB) of commerce usually contains a large fraction of ethyl vinyl benzene (a non cross-linking agent) and also a nonpolymerizable solvent of diethyl benzene. The highest divinyl benzene content of todays commercial product is about 72% but this is expensive and difficult to obtain, therefore necessitating the use of the more readily available 50–60% DVB. The amount of the cross-linking agent employed may vary within wide limits from 20 to 80 mole % of the total polymerized monomers in the membrane resin phase with the preferable range being between 25–50 mole %. Sulfonation (or phosphorylation) of the aromatic nuclei of the polymer unit of the structure of formula No. II will add to the total capacity of the resulting membrane as noted in formula No. III.

Thus the sulfonic acid or phosphonic acid groups of the bifunctional membrane may be carried by both the polyvinyl cross linking groups and the monovinyl groups such groups being derived from for example styrene, vinylsulfonic acid, methyl styrene, vinyl phosphoric acid, alkyl sulfuric acid, alkyl phosphonic acid, alpha and beta napthyl akyl substituted styrenes, divinylbenzenes, alkyl substituted divinyl benzenes, alkyl phenylvinyl ethers, vinylanthracenes and the like. The preferred copolymeric matrix however, will contain components comprising either individually or as mixtures the following: (a) acrylic acid and/or methacrylic acid (b) ethyl styrene and (c) divinylbenzene.

The membranes may be formed by various methods but it is preferred that a polymer substrate of acrylic acid-vinyl styrene-divinyl benzene be polymerized in sheet form and then post-sulfonated or postphosphonated as the case may be. Of course the post treatment is not necessary where the monomer employed is already in the sulfonated or phosphonated forms as where such monomers as vinylsulfonic acid or methyl styrene vinyl phosphoric acid and the like are used.

Suitable solvents in which the polymerizable material may be dissolved prior to polymerization should be inert to the polymerization (in that they do not react chemically with the monomers) and should preferably be miscible with the sulfonation medium. They include, for example aromatic hydrocarbons such as toluene, benzene, and diethylbenzene; alcohols such as isopropanol; ketones such as cyclohexanone and acetone ethers such as dioxane or dichloro diethyl ether; halogenated hydrocarbons such as ethylene chloride or ethylene bromide; and hydrocarbons such as heptane. Suitable mixtures of solvents may be employed also. Hydrocarbons (such as heptane) which are not readily miscible with the sulfonation media are not recommended in preference to other solvents when the polymerized structures are sulfonated without first replacing the solvent of polymerization. Other solvents may be used which are susceptible of forming solutions of the required concentration with the cross-linking, mono vinyl and carboxylic compounds and which does not interfere with the polymerization.

Prior to polymerization the polymerizable ingredients are dissolved in the solvent to form a solution containing the desired per cent by volume of solvent. The volume of this non-polymerizable (NP) solvent present during polymerization determines and fixes the solvent or liquid content of the resulting polymeric structure. The solvent contained in the polymeric structure can be replaced by another solvent, and the structure will imbibe about the same volume of water or other liquid as was present as the original solvent during the polymerization reaction. It has been determined that the solvent of polymerization should be present during polymerization to the extent of at least 15% by volume based on the total volume of the monomeric mixture including the solvent. Although a minimum solvent content of 15% has been found effective for purposes of this invention, preferred embodiments include much larger amounts between about 20 and 50%. Structures including as much as 75% solvent have been found satisfactory.

The solvent of polymerization may be replaced by other solvents prior to sulfonation of the polymerized structure or board as by leaching the structure therein. Where heptane or other similar solvents are used for the polymerization, these should preferably be replaced by a more suitable solvent for the sulfonation step. Solvent substitution is advantageous particularly if the ion exchange groups are to be introduced after polymerization, for example, by the sulfonation of the polymerizate structure. solvent substitution permits the use of one solvent particularly suitable for the polymerization and of a second solvent which is well suited for the introduction of the strongly acid cation active exchange groups. The agent active in the introduction of the exchange groups may be dissolved in a solvating liquid which is different from the one which solvates the structure or the active agent may itself be a suitable solvating liquid. The use of non-polymerizable solvents and solvent substitutions is well known in the art as examplified in U.S. Pat. No. 2,730,768 and others.

The copolymerization of the monomers is accelerated by means of well recognized catalysts such as organic peroxide compounds (benzoyl peroxide being the preferred reagent for this invention), azo catalysts and the so called redox "free radical" catalysts such as perborates and persulfates which are suitably activated by appropriate reducing species. The monomers may also be suitably co-polymerized by the well known art of irradiation whether the source is light or the more effective gamma radiation waves.

The resin structure resulting after polymerization (called a board) initially contains the weakly acid functional group (—COOH) or a salt of the same group. This board is preferentially swollen in suitable and well known swelling solvents such as the chlorinated hydrocarbons typically (ethylene dichloride), chlorinated ethers, akyl hydrocarbons etc., or mixtures thereof prior to sulfonation (or phosphorylation as the case may be) to assist and shorten the sulfonation step. The board is then selectively sulfonated preferably in a one to two molar solution of sulfur trioxide complexed with an equimolar amount of benzoic acid in ethylene chloride, or more simply immersed in an oleum bath which may range between 5 and 70% oleum. The temperature range during sulfonation is preferably between 15°C and 35°C in order to prepare in large yields membranes of suitable physical properties although temperatures in the range of 0°C to 55°C are useable with sulfonation usually completed within about 16 hours.

In accordance with this invention, the monomer supplying the weak carboxylic acid group (or its sodium salt) may be widely varied in the range of about 1 to 99 mole % while that of the total of the vinyl monomers supplying the strong to medium strong acid group (sulfonic or phosphonic acid or their sodium salt forms added into the membrane structure by the sulfonation or phosphorylation step) may concurrently be represented by about 99 to 1 mole %. The total capacity of the resulting membrane can thus range from about between 3 to 11 meq. per gram of dry resin. If the phosphonic acid group is used rather than the sulfuric acid group only the first (or active) portion of any phosphonic group is considered and the same 3 to 11 meq. capacity sequences will apply.

In one broad concept of this invention the bifunctional membrane as described hereinbefore may be used to great advantage as a fluid separator in an electrolytic cell where a caustic solution is separated from a neutral or slightly acidic solution. Thus both sides of this membrane will not necessarily always be totally in the alkali metal or sodium salt form. This system or electrolytic cell was previously described as an "$SO_2$ scrubber" cell but it will be apparent that this same system is equally adapted and functionable in other electrolytic cells such as a "caustic-chlorine" cell employing sodium chloride as indicated in parentheses in the single diagramatic drawing.

The drawing diagramatically shows an electrolytic cell 1 of the "$SO_2$ scrubber" type having a novel bifunctional cation membrane separator 2 of the character previously described dividing the cell essentially into two fluid containing separate chambers. The catholyte in cathode chamber 8 being basic, the anolyte in anode chamber 6 being acidic and the solution in the feed or center chamber 7 being neutral or slightly acid in character. An acid resistant hydraulically permeable porous diaphragm 3 is interposed between the anode 5 and the bifunctional cation selective membrane 2 to minimize contact of the anodically formed $H^+$ ions with the bifunctional membrane face adjacent to center chamber 7. Any reaction at the face or surface of the membrane which results in the $-COO^-Na^+$ changing to the $-COOH$ groups is deterimental to the efficient operation of the cell since the $-COOH$ functional group is essentially non-conductive. Materials of construction for these porous diaphragms include rubber, ceramics, polyethylene, polypropylene, ethylene propylene copolymers and terpolymers, polyvinyl chloride, polyvinyl acetate, copolymers of vinyl acetate and vinyl chloride, copolymers of ethylene and vinyl acetate, polyvinylidene chloride, copolymers of vinylidene chloride and vinyl chloride, polyacrylonitrile, copolymers of acrylonitrile and vinyl chloride, nylon, wool, copolymers of styrene and butadiene, cellulose, regenerated cellulose, cellulose acetate, burlap, canvas, asbestos, polytetrafluoroethylene, polyvinylidene fluoride, polyvinyl fluoride, polychlorotrifluoroethylene, epoxy-bonded glass fiber mats, polyester bonded glassfibers and the like. Many of these materials may also be employed to reinforce the cation membrane structure by casting the monomeric resin material onto woven or matted sheets of said material.

In operation the feed solution for example a sodium sulfate solution ($Na_2SO_4$) enters chamber 7 and the product obtained by the electrolytic decomposition reaction during passage of a direct current across electrodes 4 and 5, forms $H_2SO_4$ in anode chamber 6 where it is removed as an acidic product. The sodium ($Na^+$) ion of the $Na_2SO_4$ feed solution selectively passes through the bifunctional cation membrane by virtue of the high capacity and high conductivity of the membrane regardless of the acidity of the solution in contact with the anodic face of said membrane. NaOH solution is produced in cathode chamber 8 by the reaction of the negative electrode 4 in splitting water and is removed therefrom to form the caustic absorption medium for scrubbing $SO_2$ gas from a source of desired removal, (see U.S. Pat. No. 3,475,122 to McRae et al). It will also become apparent in the use of the novel membrane of the present invention there would be little loss in conductivity should an acid solution contact the bifunctional membrane 2 since the sulfonic acid group attached thereto would still conduct in their own way independently of the carboxylic acid groups contained therein. The bifunctional membrane operates to sustain a synergistic high conductivity of $Na^+$ ions therethrough and in addition is substantially insensitive of pH variations. The capacity of such a membrane is enhanced along with improved dimensional stability. This dimensional stability is an important property for membranes used in electrochemical, electrodialytic or dialysis equipment in which the membrane is customarily clamped tightly between two rigid frames to produce fluid tight equipment. It is apparent that if a membrane is clamped into a rigid and fixed position while in its most elongated or swollen state, then allowed to contract (as carboxylic type membranes are especially prone to do when converted from their highly extended or swollen ionic form (Na salts) to their contracted acidic and non-ionized forms) such as membrane will be subjected to great physical stress which may easily cause ruptures, tears, or minute pin hole areas. This deleterious contraction can easily lead to early operational failures. The present invention reduces this tendency for large area changes due to pH variations by utilizing the synergistic and unique property of the sulfonic acid groups and their salts to remain ionized throughout pH variations.

To demonstrate, two membranes were compared; membrane (A) containing only carboxylate groups and having a capacity of 2.80 meq. of $Na^+$ per dry gram of resin and membrane (B) containing equivalent quantities (1 to 1 ratio) of carboxylate and sulfonate groups and having a total capacity of 3.98 meq. of $Na^+$/dry gram of resin. The membranes were measured for area contraction when the pH of the solution in which they were immersed was changed from 14 down to 1 which resulted in the following reactions:

| | | | |
|---|---|---|---|
| (Membrane A) | $-COO^-Na^+ \rightarrow -COOH$ | (un-ionized) | |
| (Membrane B) | $-SO_3^-Na^+ \rightarrow -SO_3^-H^+$ | (still ionized) | |
| | $-COO^-Na^+ \rightarrow -COOH$ | (un-ionized) | |

| | | Membrane A | Membrane B |
|---|---|---|---|
| Total Surface Area in $cm^2$ | (in 1N NaOH) pH 14 | 54.7 | 44.4 |
| " | (in 0.1 N HCl) pH 1 | 50.4 | 42.9 |
| " | Contraction in $cm^2$ | −4.3 | −1.5 |
| " | Area Change | −7.9% | −3.4% |

It thus becomes apparent that the bifunctional cation membrane (B) is superior in its dimensional stability to that of the unifunctional carboxylic type (A) which is more subject to ruptures or cracking by reason of its greater degree of contraction.

This invention is further illustrated by the following examples describing the preparation of the bifunctional cation exchange membranes and their use in an electrolytic sulfate cell especially of the type as shown in the drawing employed for the removal and recovery of sulfur dioxide ($SO_2$) from a gas stream.

EXAMPLE I

Divinyl benzene, ethyl styrene, acrylic acid matrix with post sulfonation - cross-linking 45%, non-polymer content 23%

A one liter mixture of the following composition is made up and poured into a 14 inches × 12 inches deep polytetrafluoroethylene coated rectangular tank into which is then alternately placed in a stack arrangement 9 inches × 11 inches glass sheets (⅛ inch thick) and non-woven polypropylene mat of any thickness desired but in this case 0.03 cm. thick.

| | |
|---|---|
| 55% Commercial Divinylbenzene* | = 650 ml. (cross-linking agent) |
| Glacial Acrylic Acid | = 152 ml. (COOH monomer) |
| Diethylbenzene | = 175 ml. (nonpolymerizable solvent) |
| Isobutyl Alcohol | = 23 ml. (nonpolymerizable solvent) |
| Benzoyl Peroxide | = 13.5 grams (catalyst) |

*The composition contains by weight 55% divinylbenzene (DVB) 40% ethyl vinylbenzene (ethyl styrene) and 5% diethylbenzene.

The tray containing the stack of glass sheets and reinforcing cloth (all totally immersed in the monomeric mixture) is placed into an oven at 70°C and allowed to polymerize for a 16 hour period. The resulting solidified mass is removed from the tray and after chipping away excess polymer from the outside of the glass stack the membranes containing the resin impregnated cloth material are each carefully removed from between the glass plates and placed in ethylene dichloride which acts jointly as a storage medium and a resin swelling agent. The resulting membranes (or boards) are composed of a cast copolymer resin of divinylbenzene, ethyl styrene, and acrylic acid surrounding a reinforcing sheet of polypropylene cloth. After sufficient swelling, the membranes are next placed into a tray containing a sulfonating bath of the following formulation:

a. 20 ml. of reagent grade concentrated sulfuric acid.
b. 100 ml. of 15% oleum (fuming sulfuric acid containing 15% by weight of $SO_3$ dissolved in 100% $H_2SO_4$)

The membranes are allowed to remain in the sulfonating bath overnight; then removed and immersed directly into distilled water for a period of from 4 to 16 hours using three to four water exchanges.

The ion-exchange capacity of the resulting bifunctional group membrane is found via the well known salt split titration and total titration with 0.1N NaOH. The results gave a total capacity of 4.02 meq. per gm of dry resin of which 1.92 meq. was contributed by the sulfonate groups and the remaining 2.10 meq. by the carboxylate groups.

The resistivity of this dual acid group membrane in 0.01N HCl measured only 14.8 ohm-cm². However in its carboxylic form only (before sulfonation) it measured in the 0.01N acid a high 1,690 ohmcm². This defines the pH intensitivity of this high capacity membrane.

EXAMPLE II

The same operation is carried out as described in Example 1 except that the sulfonation is carried out in a "Sulfen" (trademark) bath which is liquid $SO_3$ complexed with an equimolar quantity of benzoic acid. The capacity of the resulting dual ionogenic membrane was found to be the following:

| | | |
|---|---|---|
| $-SO_3^-H^+$ | = | 1.99 meq/gm. |
| $-COOH$ | = | 2.10 meq/gm. |
| Total Capacity | = | 4.09 meq/gm. |
| Resistivity to 0.01 N HCl | = | 12.3 ohm/cm.² |

EXAMPLE III

Again the same as in Example I except that the formulation is modified as follows:

| | | |
|---|---|---|
| 55% DVB | = | 618 ml. |
| Glacial Acrylic Acid | = | 152 ml. |
| Diethyl Benzene | = | 167 ml. |
| Isobutanol | = | 22 ml. |
| Benzoyl Peroxide | = | 12.8 gm. |

This gave a total capacity of 4.5 meq/gm. dry resin as follows:

| | | |
|---|---|---|
| $-SO_3^-H^+$ | = | 1.7 meq/gm. |
| $-COOH$ | = | 2.8 meq/gm. |

EXAMPLE IV

The same as in Example I except that the formulation change was as follows:

| | | |
|---|---|---|
| 55% DVB | = | 528 ml. |
| Glacial Acrylic Acid | = | 304 ml. |
| Diethyl Benzene | = | 180 ml. |
| Isobutanol | = | 24 ml. |
| Benzoyl Peroxide | = | 14.0 gm. |

This gave a total capacity of 7.0 meq/gm. dry resin.

EXAMPLE V

The same as in Example I except that the formulation is as follows:

| | | |
|---|---|---|
| 55% DVB | = | 550 ml. |
| Ethylene Glycol Dimethacrylate | = | 50 ml. (additional crosslinking agent) |
| Glacial Acrylic Acid | = | 152 ml. |
| Diethyl Benzene | = | 175 ml. |
| Isobutanol | = | 23 ml. |
| Benzoyl Peroxide | = | 14.0 grams |

The total capacity of the final resin measured 4.8 meq/dry gram resin.

EXAMPLE VI

The same operation as described in Example I except that instead of sulfonation a phosphorylation step is carried out as follows:

The membranes in an organic swelling agent of ethylene dichloride are contacted with 1.1 times their weight of anhydrous aluminum chloride and excess phosphorous trichloride ($PCl_3$) added in liquid form (a 2:1 molar excess of $PCl_3$ is usually adequate). These are left in an anhydrous condition at room temperature for a 24 hour period. The membranes are removed from the reaction bath and placed into another ethylene dichloride bath which is continuously saturated with chlorine gas for a period of two hours. The membranes are removed, placed in warm water (70°–80°C) and allowed to hydrolyze for a period of about 4 hours. The procedure resulted in a membrane partly in the phosphoric acid form and partly in the carboxylate form. The total capacity measured 8 meq. per dry gram of resin using only the first hydrogen dissociated by the phosphonic acid group as active for the calculation.

EXAMPLE VII

The same operations were carried out as described in Example I except that methacrylic acid was used instead of acrylic acid as the —COOH monomer. The total capacity measured 4.05 meq. per dry gram of resin.

EXAMPLE VIII

The same operations were carried out as described in Example I except that the formulation was modified as follows:

| | | |
|---|---|---|
| 55% DVB | = | 396 ml. |
| Glacial Acrylic Acid | = | 625 ml. |
| Diethyl Benzene | = | 230 ml. |
| Isobutanol | = | 29 ml. |
| Benzoyl Peroxide | = | 20 gm. |

This gave a total capacity of 10.15 meq/gm dry resin.

EXAMPLE IX

A three compartment electrolytic cell (of the general type disclosed and described in connection with the drawing) containing a platinum-coated titanium anode and a nickel cathode is used to convert a 2 normal neutral solution of sodium sulfate essentially into sodium acid sulfate and sodium hydroxide. The diaphragm is microporous polyethylene and has a thickness of 0.25 millimeter and is supported on its anode side by a nonwoven, bonded polyethylene screen having an expanded thickness of 2.3 millimeters which thus determines the diaphragm-anode spacing. The void volume of the diaphragm is about 70 percent and the average pore size is about 0.3 microns.

One electrolytic cell is designated (A) and employs the prior art unifunctional carboxylic cation selective membrane of the type described in U.S. Pat. No. 2,731,408 prepared from a monomeric mixture of divinyl benzene, ethyl styrene and acrylic acid. Another electrolytic cell is designated (B) and employs the bifunctional cation selective membrane of the present invention as prepared and described in Example I herein. Both membranes are reinforced with polypropylene mat and have a thickness of about 0.03 cm. The membrane in cell (A) has an areal resistance of 5.0 ohm-cm.$^2$ in 1 molar sodium hydroxide at 150°F., a 45% cross-linking (XL), a water content (NP) of about 23 percent of its dry weight and a cation exchange capacity of about 3 milliequivalents per dry gram of resin. The membrane in cell (B) has an areal resistance of 4.2 ohm cm.$^2$, a water content of about 23 percent and a cation exchange capacity of about 4 milliequivalents. The membranes are also supported on their cathode side by polyethylene screen having an expanded thickness of 2.3 millimeters. The sodium sulfate solution is introduced into the central compartments at a rate of 4 liters per hour per active square foot of anode. At the cathode, 4 liters of caustic per hour per square foot of cathode is removed from the recirculating catholyte stream and the volume is maintained by adding distilled water. The current density at the electrodes are maintained at 120 amperes per square foot and the temperature of the cell is maintained at 140°F by recirculating both the anolyte and the catholyte through heat exchangers. The voltage required is 5.5 for cell A and 5.3 for cell B. At steady state operation the catholyte bleed from the cathode compartment of both cells is found to have a concentration of about one equivalent per liter indicating a current efficiency of about 9%. The pH of both center cell solutions is found to vary between 6.9 – 7.4. The center cell solutions are then made strongly acidic to a pH of between about 2.0 to 2.6 by the addition of sulfuric acid to the neutral sodium sulfate feed. Almost immediately the resistance across both cells is increased; cell A rising sharply to between 7.2 – 8.0 volts and cell B only slightly to about 5.4. The cells are maintained under this acidic condition for one-half hour and again returned to operation with the neutral sodium sulfate solution. At steady state operation both cells return to their initial voltage, however the cathode current efficiency of cell A is determined to have dropped to about 69–72% while cell B returned to the original current efficiency of 88 to 90%.

Both cells are then disassembled and the membranes carefully examined. The inspection uncovered many small cracks, pin holes and buckling of membrane A and on being hydraulically tested revealed leakage. On the other hand membrane B showed only slight buckling with no noticeable leakage.

The above examples show various embodiments of basic disclosures of membrane synthesis in accordance with the present invention with the resulting bifunctional membranes enhanced operating capacities and synergistic conductivities.

What is claimed is:

1. A solid bifunctional cation selective membrane having at least two dimensions in excess of one cm. comprising a cross-linked polymer matrix bonded to both carboxylic acid and sulfonic acid functional groups, said matrix being a polymerized product of a solution mixture of at least one monvinyl aromatic monomer, at least one polyvinyl aromatic monomer, at least one olefinic carboxylic monomer and a non-polymerizable organic hydrocarbon solvent, said mixture containing said polyvinyl monomer between 40–50 mole % of the total polymerizable monomers and between 20–50% by volume of said non-polymerizable solvent, the said sulfonic acid groups being chemically bonded to the vinyl aromatic nuclei of said polymer matrix in an amount averaging 0.65 to 1.2 groups for every carboxylic acid group containing therein and wherein the mole ratio of the monovinyl monomer to carboxylic monomer is 1:3 to 3:1, the said membrane having a capacity of between about 4 to 11 meg./dry gm. of polymerized product, and being substantially dimensionally stable and ionically conductive substantially over the entire pH range.

* * * * *